US009015285B1

(12) United States Patent
Ebsen et al.

(10) Patent No.: US 9,015,285 B1
(45) Date of Patent: Apr. 21, 2015

(54) USER INTERFACE FOR ACCESSING MEDIA AT A GEOGRAPHIC LOCATION

(71) Applicant: Snapchat, Inc., Venice, CA (US)

(72) Inventors: Rylee Ebsen, Venice, CA (US); Nathan Jurgenson, Venice, CA (US); Ryan Marzolph, Venice, CA (US); Evan Spiegel, Venice, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/539,391

(22) Filed: Nov. 12, 2014

(51) Int. Cl.
*G06F 15/16* (2006.01)
*H04L 29/06* (2006.01)
*H04L 29/08* (2006.01)

(52) U.S. Cl.
CPC ............... *H04L 65/60* (2013.01); *H04L 67/18* (2013.01)

(58) Field of Classification Search
None
See application file for complete search history.

*Primary Examiner* — Ranodhi Serrao
(74) *Attorney, Agent, or Firm* — Schwegman Lundberg & Woessner, P.A.

(57) ABSTRACT

A system and method for accessing a media item on a mobile device are described. The mobile device includes a media placement application and a media display application. The media placement application receives a selection of a media item generated by the mobile device. The media placement application generates access conditions for the media item based on geolocation and position information of the mobile device associated with the selected media item. The media display application monitors the geolocation and position of the mobile device and determines whether the geolocation and position of the mobile device meet the access conditions of the selected media item. The media display application generates a notification that the selected media item is available to view in a display of the mobile device in response to determining that the geolocation and position of the mobile device meet the access conditions of the selected media item.

16 Claims, 23 Drawing Sheets

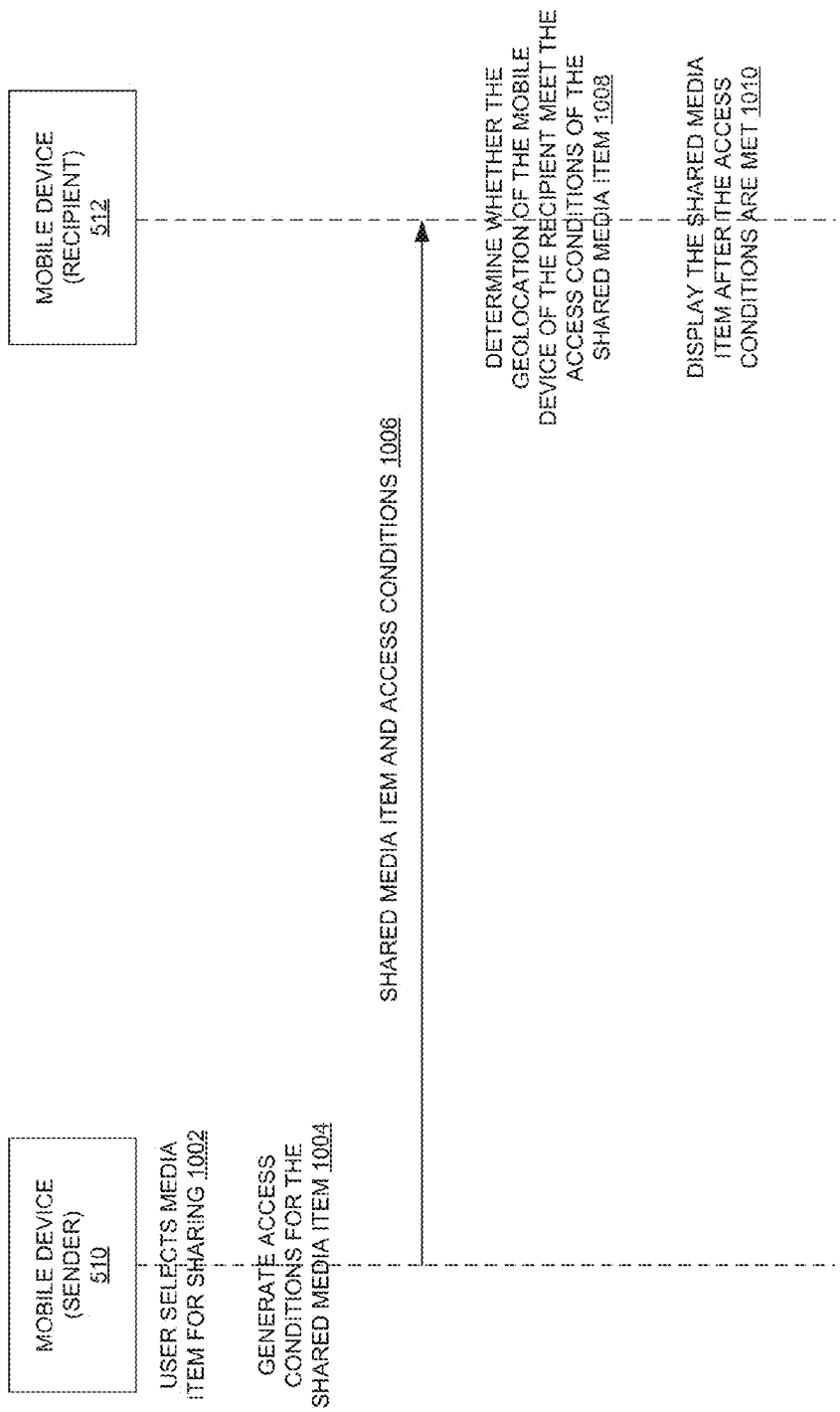

USER INTERFACE FOR ACCESSING MEDIA AT A GEOGRAPHIC LOCATION

TECHNICAL FIELD

The subject matter disclosed herein generally relates to user interface technology. Specifically, the present disclosure addresses systems and methods that provide a user interface for accessing media on a mobile device.

BACKGROUND

There has been an unprecedented boom in the popularity of amateur photography sparked by the widespread adoption of mobile technology, mobile phones in particular, that incorporates cameras. In fact, mobile phone manufacturers have supplanted traditional camera companies as the world's largest producers of cameras. Software development companies have responded to this boom by creating photographic applications that allow users of mobile phones to manipulate and view photographs in creative ways. Such photographic applications may allow a user to view digital photographs taken within a specific time period (e.g., recently taken photographs, or photographs taken in a specific month or year). However, if the user wishes to view a photograph previously taken at a particular geographic location (e.g., Venice Beach, Calif.), the user may be required to tediously scroll through a large number of photographs.

BRIEF DESCRIPTION OF THE DRAWINGS

The present disclosure is illustrated by way of example, and not by way of limitation, in the figures of the accompanying drawings, in which:

FIG. 10A shows an interaction diagram illustrating one example embodiment of a process for sharing a media item;

DETAILED DESCRIPTION

Figure 1:
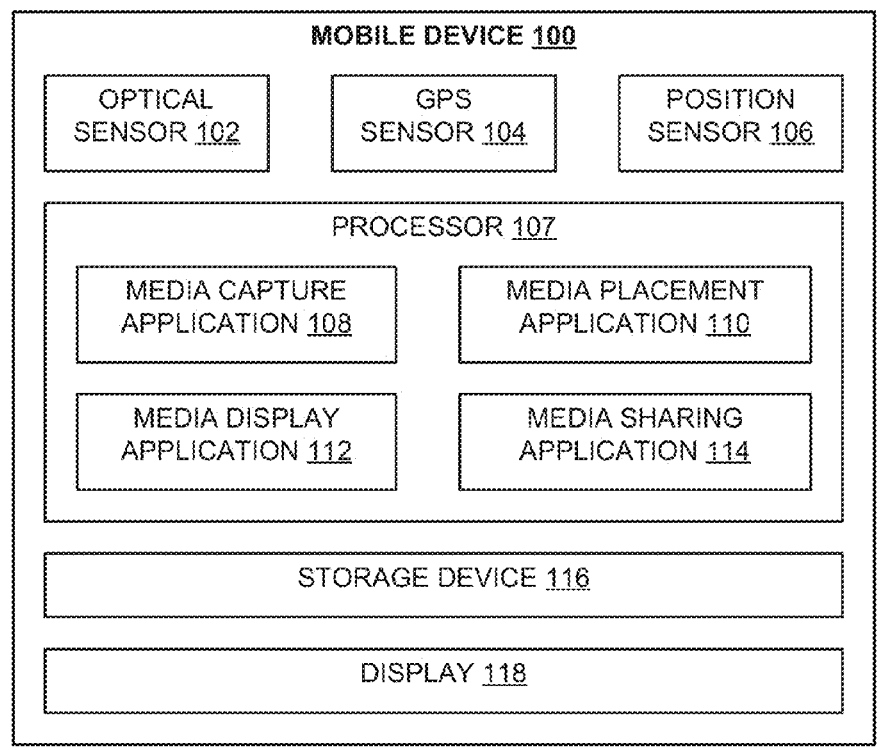
FIG. 1 shows a block diagram illustrating one example embodiment of a mobile device.

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In one example embodiment, a user of a mobile device (e.g., mobile phone) selects pictures that have already been taken with the mobile device. The mobile device places each selected picture on a geographic map to identify the geographic locations (also referred to as geolocations) where the pictures were taken. The mobile device monitors its own geolocation. When the mobile device detects that its location corresponds to a spot where a stored picture was previously captured, the mobile device displays the stored picture. For example, the user may take a picture of a sunset at Venice Beach on his mobile device and may select the picture of the sunset from a photographic application for placement. When the user later visits the same location in Venice Beach where the previously taken picture of the sunset was captured, that previously taken picture appears on the display of the mobile device (e.g., when the mobile device is held up by the user).

In another example embodiment, the mobile device generates a notification to the user when the mobile device detects that it is located at a spot where a stored picture was previously taken. The notification informs the user that the stored picture previously taken from the same spot is available for viewing. The notification further includes instructions to raise the mobile device to view the stored picture. The mobile device detects its position in space and displays the stored picture when the position of the mobile device coincides (e.g., within a threshold tolerance) with the position of the mobile device when the stored picture was originally captured. For example, the mobile device displays the stored picture when the mobile device is raised and pointed in about the same direction that the mobile device was pointed when the stored picture was captured. In another example, the mobile device displays visual guides, such as an arrow, to instruct the user of the mobile device in which direction to point the mobile device to access and view the stored picture.

In another example embodiment, the mobile device can share a picture with another mobile device (e.g., a receiving mobile device). The receiving mobile device displays the shared picture when the receiving mobile device is located at the point at which the shared picture was captured. Similarly, the receiving mobile device generates a notification when it detects that it is located at that same point at which the shared picture was captured. The notification informs the user of the receiving mobile device that the shared pictures are available for viewing. The notification instructs the user to raise the receiving mobile device to view the shared picture. In another example, the receiving mobile device instructs the user to go to the spot where the shared picture was captured to access and view the shared picture.

In another example embodiment, the user of the mobile device selects a picture previously taken with the mobile device and associates it with other geolocations, in addition to the geolocation at which the picture was captured, but virtually placing the picture at these other geolocations. Accordingly, when the mobile device detects that it is located at one of the other geolocations, the mobile device displays the picture. For example, the user may select a picture of the Santa Monica Pier taken in Santa Monica, and the user may virtually place the selected picture on Huntington Beach Pier in a map. When the user of the mobile device later visits Huntington Beach Pier and holds his mobile device up, a picture of Santa Monica Pier appears on the display of the mobile device. The user can then view and compare the actual Huntington Beach Pier with the previously taken picture of Santa Monica Pier. In another example, the user may select pictures taken at Yosemite National Park and virtually place them in other National Parks on a map. When the user later visits these other National Parks, the pictures taken at Yosemite National Park may be presented in the mobile device of the user. The user can then easily access and view his old pictures that are relevant to National Parks without having to browse through a multitude of pictures in the photo viewing application of his mobile device when the user is at one of the other National Parks.

Various examples of a media placement application, a media display application, and a media sharing application in the mobile device are described. The media placement application operates at the mobile device and associates pictures and videos with corresponding geolocations where the media was generated. The media display application operates at the mobile device and generates a display of the picture or video corresponding to a geolocation where the mobile device is currently located. The media sharing application operates at the mobile device and generates a message to another mobile device to enable viewing of a shared picture when the other mobile device is located at a geolocation associated with the shared picture. The message may include a shared picture and corresponding geolocation information. In another embodiment, the media placement application, media display application, and media sharing application operate with a server.

FIG. 1 shows a block diagram illustrating one example embodiment of a mobile device 100. The mobile device 100 includes an optical sensor 102, a Global Positioning System (GPS) sensor 104, a position sensor 106, a processor 107, a storage device 116, and a display 118.

The optical sensor 102 includes an image sensor, such as, a charge-coupled device. The optical sensor 102 captures visual media. The optical sensor 102 can be used to media items such as pictures and videos.

The GPS sensor 104 determines the geolocation of the mobile device 100 and generates geolocation information (e.g., coordinates). In another embodiment, other sensors may be used to detect a geolocation of the mobile device 100. For example, a WiFi sensor or Bluetooth sensor can be used to determine the geolocation of the mobile device 100.

The position sensor 106 measures a physical position of the mobile device relative to a frame of reference. The frame of reference may be the magnetic North Pole. For example, the position sensor 106 may include a geomagnetic field sensor to determine the direction in which the optical sensor 102 of the mobile device is pointed (e.g., West) and an orientation sensor to determine the orientation of the mobile device (e.g., raised, lowered, or leveled). In another example, the position module 206 generates an azimuth angle and an elevation angle to identify the relative position of the mobile device 100 in space. For example, an azimuth angle of 0 degrees indicates that the optical sensor 102 is pointed at Magnetic North. An elevation of 0 degrees indicates that the optical sensor 102 is pointed to the horizon.

The processor 107 may be a central processing unit that includes a media capture application 108, a media placement application 110, a media display application 112, and a media sharing application 114.

The media capture application 108 includes executable instructions to generate media items such as pictures and videos using the optical sensor 102. The media capture application 108 also associates a media item with the geolocation and the position of the mobile device 100 at the time the media item is generated using the GPS sensor 104 and the position sensor 106.

The media placement application 110 includes executable instructions to enable a user of the mobile device 100 to select and place the media items on a geographic map.

The media display application 112 includes executable instructions to determine whether the geolocation of the mobile device 100 corresponds to the geolocation of one of the media item selected with the media placement application 110. The media display application 112 displays the corresponding media item in the display 118 when the mobile device 100 is at the geolocation where the media item was previously generated.

The media sharing application 114 includes executable instructions to generate a message to another mobile device to share a media item. The mobile device of the recipient can view the shared media item when the mobile device of the recipient is at the geolocation where the shared media item was previously generated with the mobile device of the sender.

The storage device 116 includes a memory that may be or include flash memory, random access memory, any other type of memory accessible by the processor 107, or any suitable combination thereof. The storage device 116 stores the media items selected by the user for placement and also stores the corresponding geolocation information. The storage device 116 also stores executable instructions corresponding to the media capture application 108, the media placement application 110, the media display application 112, and the media sharing application 114.

The display 118 includes, for example, a touch screen display. The display 118 displays the media items generated by the media capture application 108. A user selects media items for placement by touching the corresponding media items on the display 118. A touch controller monitors signals applied to the display 118 to coordinate the selection of the media items.

The mobile device 100 also includes a transceiver that interfaces with an antenna. The transceiver may be configured to both transmit and receive cellular network signals, wireless data signals, or other types of signals via the antenna, depending on the nature of the mobile device 100. Further, in some configurations, the GPS sensor 104 may also make use of the antenna to receive GPS signals.

Figure 2:
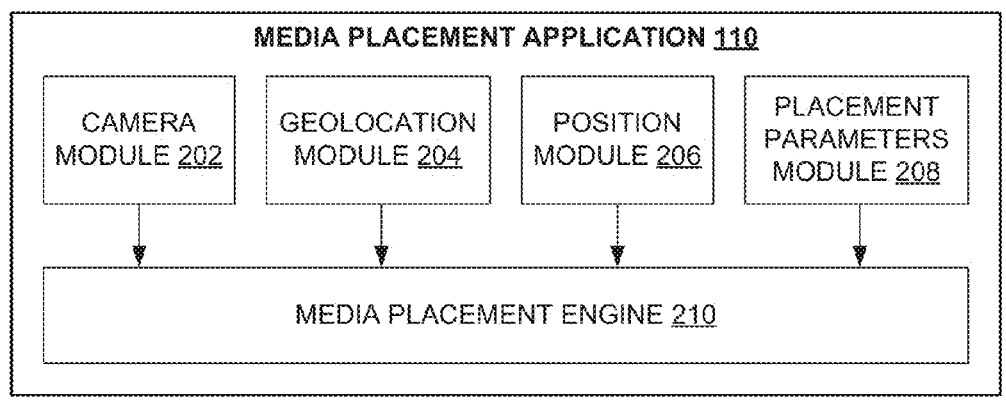
FIG. 2 shows a block diagram illustrating one example embodiment of a media placement application.

FIG. 2 shows a block diagram illustrating one example embodiment of a media placement application 110. The media placement application 110 includes a camera module 202, a geolocation module 204, a position module 206, a placement parameters module 208, and a media placement engine 210.

The camera module 202 communicates with the media capture application 108 to access the media items generated at the mobile device 100. In one example, the camera module 202 accesses the media items selected for placement by the user of the mobile device 100. In another example, the camera module 202 accesses media items generated from other mobile devices.

The geolocation module 204 communicates with the GPS sensor 104 to access geolocation information of the corresponding media items selected by the user. The geolocation information may include GPS coordinates of the mobile device 100 when the mobile device 100 generated the media items. In another example, the geolocation information may include GPS coordinates corresponding to the geolocation where the media items were generated using other mobile devices.

The position module 206 communicates with the position sensor 106 to access direction information and position information of the mobile device 110 at the time the mobile device 100 generated the media item. The direction information may include a direction (e.g., North, South, East, West, or other azimuth angle) in which the mobile device 100 was pointed when the mobile device 100 generated the media item. The orientation information may identify an orientation (e.g., high above the horizon, low towards the ground, or other elevation angle) at which the mobile device 100 was pointed when the mobile device 100 generated the media item.

The placement parameters module 208 accesses predefined ranges for the geolocation information, direction information, and position information. The predefined ranges identify a range for each parameter (e.g., geolocation, direction, and position). For example, a geolocation range for the geolocation information may be 100 feet. A direction range for the direction information may be 45 degrees. A position range for the position information may be 30 degrees. These ranges may be set by default or may be adjusted by the user of the mobile device 100.

The media placement engine 210 accesses the predefined ranges from the placement parameters module 208 to define access conditions for the media items. The user of the mobile device 100 can view the selected media items when the access conditions are met. For example, the media placement engine 210 receives a selection of media items from the user of the mobile device 100. The user may use the touchscreen of the display 118 to select media items for placement. The media placement engine 210 accesses the selected media items from the camera module 202, the geolocation information for the selected media items from the geolocation module 204, the direction and position information associated with the selected media items from the position module 206, and the predefined ranges from placement parameters module 208. The media placement engine 210 applies the predefined ranges to the geolocation information, the direction information, and the position information for the selected media items to generate corresponding boundaries for the selected media items. The access conditions are based on the boundaries for the selected media items.

The boundaries may include a geolocation boundary, a direction boundary, and a position boundary for a corresponding selected media item. For example, the geolocation boundary may include an area within 100 feet of the GPS coordinates of the mobile device 100 when the selected media item was generated at the mobile device 100. The direction boundary may include a direction between South East and South West based on the mobile device 100 being pointed South when the selected media item was generated at the mobile device 100 and based on a predefined direction range of 45 degrees. The position boundary may identify a position range from −30 degrees to 30 degrees based on the mobile device 100 being held up at a horizontal level when the selected media item was generated at the mobile device 100. The boundaries may be used later to determine which selected media item to display based on a current geolocation and position of the mobile device 100.

Figure 3:
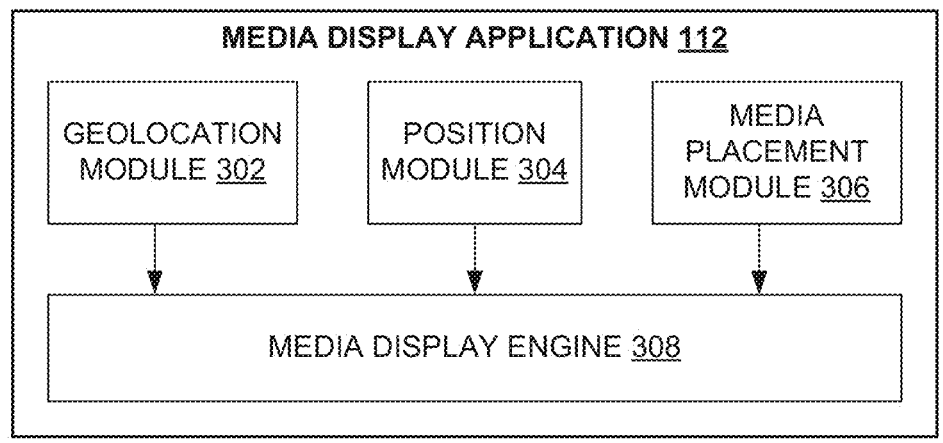
FIG. 3 shows a block diagram illustrating one example embodiment of a media display application.

FIG. 3 shows a block diagram illustrating one example embodiment of the media display application 112. The media display application 112 includes a geolocation module 302, a position module 304, a media placement module 306, and a media display engine 308.

The geolocation module 302 communicates with the GPS sensor 104 to access an updated or a current geolocation of the mobile device 100. The geolocation information may include updated GPS coordinates of the mobile device 100. In one example, the geolocation module 302 periodically accesses the geolocation information every minute. In another example, the geolocation module 302 may dynamically access the geolocation information based on other usage (e.g., every time the mobile device 100 is held up or is used by the user).

The position module 304 communicates with the position sensor 106 to access direction information and position information of the mobile device 100. The direction information may include a direction in which the mobile device 100 is currently pointed. The position information may identify an orientation in which the mobile device 100 is currently held.

The media placement module 306 communicates with the media placement engine 210 to determine the boundaries corresponding to the selected media items. For example, the boundaries for a media item may include a zip code boundary and a direction boundary (e.g., North).

The media display engine 308 accesses the current geolocation of the mobile device 100, the current direction and position of the mobile device 100, and the corresponding boundaries for the selected media items. The media display engine 308 compares the current geolocation, direction, and position of the mobile device 100 with the corresponding boundaries for the selected media items. If the media display engine 308 determines that the current geolocation, direction, and position the mobile device 100 are within the boundaries of a selected media item, the media display engine 308 displays the selected media item in the display 118.

In another example, if the media display engine 308 determines that any combination of the current geolocation, direction, and position of the mobile device 100 is within a corresponding boundary of a selected media item, the media display engine 308 displays the selected media item in the display 118. For example, the media display engine 308 displays the selected media item when the media display engine 308 determines that a current geolocation of the mobile device 100 is within a geolocation boundary of a selected media item regardless of a current direction and position of the mobile device 100.

In another example, once the media display engine 308 determines that a current geolocation of the mobile device 100 is within a geolocation boundary of a selected media item regardless of a current direction and position of the mobile device 100, the media display engine 308 generates a notification. The media display engine 308 causes the notification to be displayed in the display 118. The notification informs the user of the mobile device 100 that the selected media item is available for viewing at the current geolocation of the mobile device 100. The media display engine 308 then determines whether the direction and position of the mobile device 100 are within corresponding boundaries of the selected media item. The media display engine 308 displays the selected media item in the display 118 once the direction and position of the mobile device 100 are within the direction and position boundaries of the selected media item.

In yet another example, the media display engine 308 generates a visual guide, such as an arrow, in the display of the mobile device 100 to guide and direct the user of the mobile device 100 to position the mobile device 100 in the direction and position associated with the selected media item. For example, the mobile device 100 may display a right arrow to instruct the user to move and point the mobile device 100 further to the right. The media display engine 308 adjusts the display position of the selected media item relative to the display of the mobile device 100 based on the position of the mobile device 100 relative to the position boundary for the selected media item.

Figure 4:
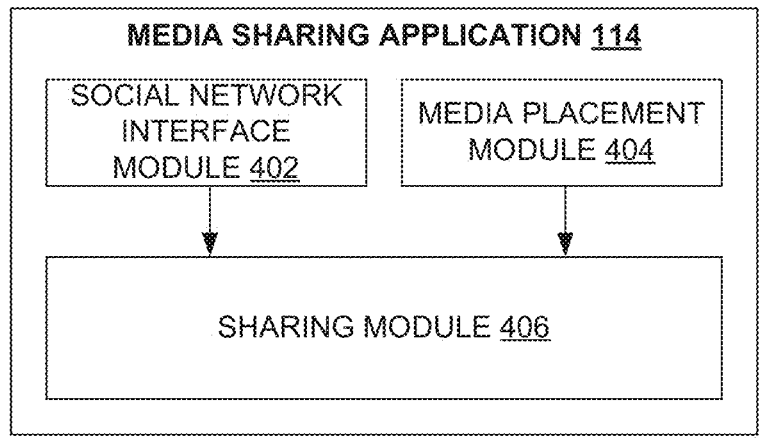
FIG. 4 shows a block diagram illustrating one example embodiment of a media sharing application.

FIG. 4 shows a block diagram illustrating one example embodiment of the media sharing application 114. The media sharing application 114 includes a social network interface module 402, a media placement module 404, and a sharing module 406.

The social network interface module 402 accesses a server of a social network service provider to access contact information of social network contacts of the user of the mobile device 100. In another example, the social network interface module 402 accesses an address book stored in the mobile device 100.

The media placement module 404 communicates with the media placement engine 210 to determine the boundaries corresponding to the selected media items. The media placement module 404 retrieves the media items selected by the user of the mobile device 100. The media placement module 404 also retrieves access conditions (e.g., boundaries) for the media items selected by the user of the mobile device 100. By way of example, the sharing module 406 communicates the selected media item and the access conditions of the selected media item to a second mobile device. The second mobile device monitors a combination of its geolocation and position. The second mobile device determines whether its geolocation or position meet the access conditions of the selected media item. If the second mobile device meets the access conditions, the second mobile device generates a notification of the availability to view the selected media item in a display of the second mobile device.

In another example, the second mobile device generates a first notification identifying a requested geolocation to access the selected media item. For example, the notification may be "You have received a photo. Please go to Venice Beach to view it." The second mobile device monitors its geolocation and determines whether its geolocation meets the access conditions of the selected media item. In this example, the second mobile device determines whether it is located in Venice Beach. If the access conditions are met, the second mobile device generates a second notification of the availability to view the selected media item in the display of the second mobile device.

Figure 5:
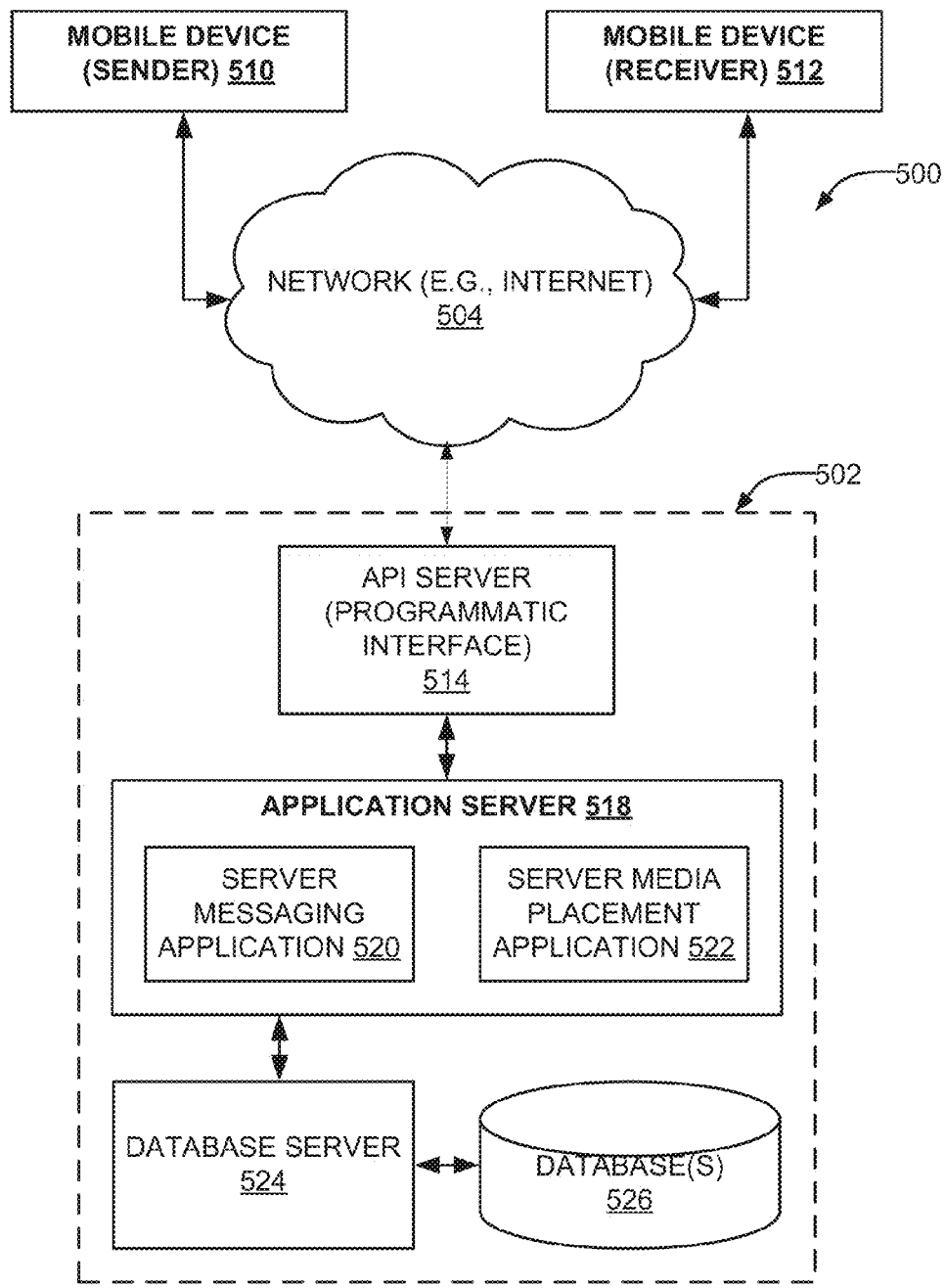
FIG. 5 is a network diagram depicting a network system having a client-server architecture configured for exchanging data over a network, according to one embodiment.

FIG. 5 is a network diagram depicting a network system 500 having a client-server architecture configured for exchanging data over a network, according to one embodiment. For example, the network system 500 may be a messaging system where clients may communicate and exchange data within the network system 500. The data may pertain to various functions (e.g., sending and receiving text and media communication, media items, and access conditions) and aspects (e.g., placement of media items, identification and retrieval of media items) associated with the network system 500 and its users. Although illustrated herein as a client-server architecture, other embodiments may include other network architectures, such as peer-to-peer or distributed network environments.

A data exchange platform, in an example, includes a server messaging application 520 and a server media placement application 522, and may provide server-side functionality via a network 504 (e.g., the Internet) to one or more clients. The one or more clients may include users that utilize the network system 500 and, more specifically, the server messaging application 520 and the server media placement application 522, to exchange data over the network 504. These operations may include transmitting, receiving (communicating), and processing data to, from, and regarding content and users of the network system 500. The data may include, but is not limited to, content and user data such as user profiles, messaging content, messaging attributes, media attributes, client device information, geolocation information, placement parameters, access conditions, and social network information, among others.

In various embodiments, the data exchanges within the network system 500 may be dependent upon user-selected functions available through one or more client or user interfaces (UIs). The UIs may be associated with a client machine, such as mobile devices 510, 512. The mobile devices 510 and 512 may be in communication with the server messaging application 520 and server media placement application 522 via an application server 518. The mobile devices 510, 512 include wireless communication components, and audio and optical components for capturing various forms of media including photos and videos as previously described with respect to FIG. 1.

Turning specifically to the server messaging application 520 and the server media placement application 522, an application program interface (API) server 514 is coupled to, and provides programmatic interface to the application server 518. The application server 518 hosts the server messaging application 520 and the server media placement application 522. The application server 518 is, in turn, shown to be coupled to one or more database servers 524 that facilitate access to one or more databases 526.

The API server 514 communicates and receives data pertaining to messages, media items, and access conditions, among other things, via various user input tools. For example, the API server 514 may send and receive data to and from an application running on another client machine (e.g., mobile devices 510, 512 or a third party server).

The server messaging application 520 provides messaging mechanisms for users of the mobile devices 510, 512 to send messages that include text and media content such as pictures and video and access conditions. The mobile devices 510, 512 can access and view the messages from the server messaging application 520. The server messaging application 520 may utilize any one of a number of message delivery networks and platforms to deliver messages to users. For example, the messaging application 120 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

The server media placement application 522 provides a system and a method for placing media items at select geolocations and enabling access to the media items when the mobile devices 510, 512 are located at the select geolocations. The server media placement application 522 provides a Graphical User Interface (GUI) that accesses pictures taken with the mobile device 510, and receives a selection of the pictures from the user of the mobile device 510. The server media placement application 522 associates the selected pictures with access conditions. When the server media placement application 522 detects that the geolocation and position of the mobile device 510 matches the geolocation and access conditions of the selected pictures, the server media placement application 522 causes the mobile device 510 to display the selected pictures. In one example embodiment, the server media placement application 522 may include components similar to the media placement application 110, the media display application 112, and the media sharing application 114.

Figure 6:
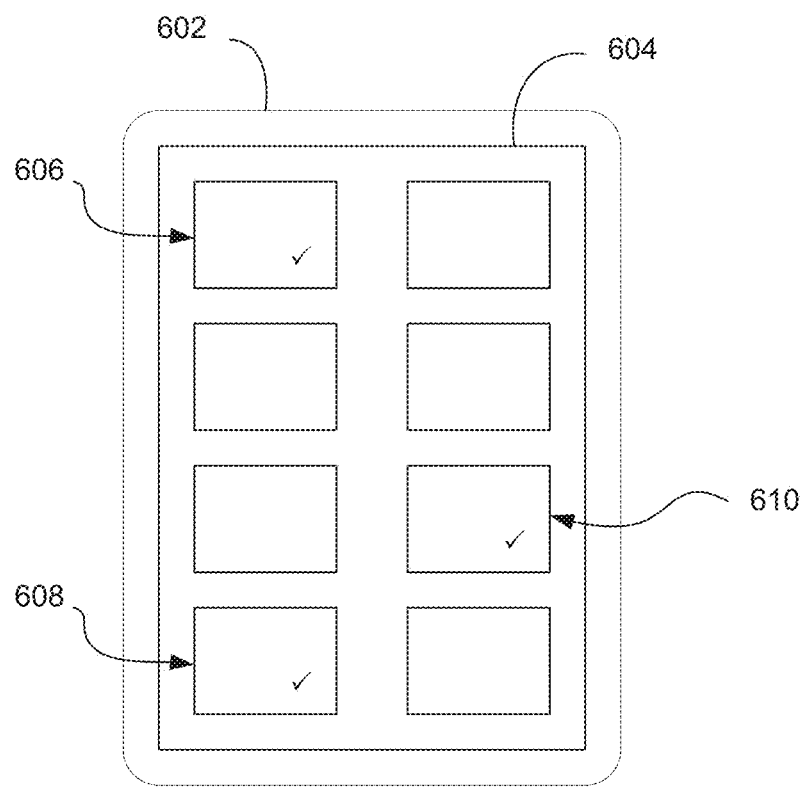
FIG. 6 shows an example of a graphical user interface to select media items.

FIG. 6 shows an example of a graphical user interface (GUI) for a user to select pictures for placement. A mobile device 602 includes a touchscreen display 604 that shows a gallery of pictures. The user selects pictures 606, 608, and 610 for placement and notification by tapping the touchscreen display 604 on top of the picture 606, 608, and 610. The mobile device 602 displays the corresponding selected pictures in the display 604 when the geolocation of the mobile device 602 later satisfies the access conditions.

Figure 7A:
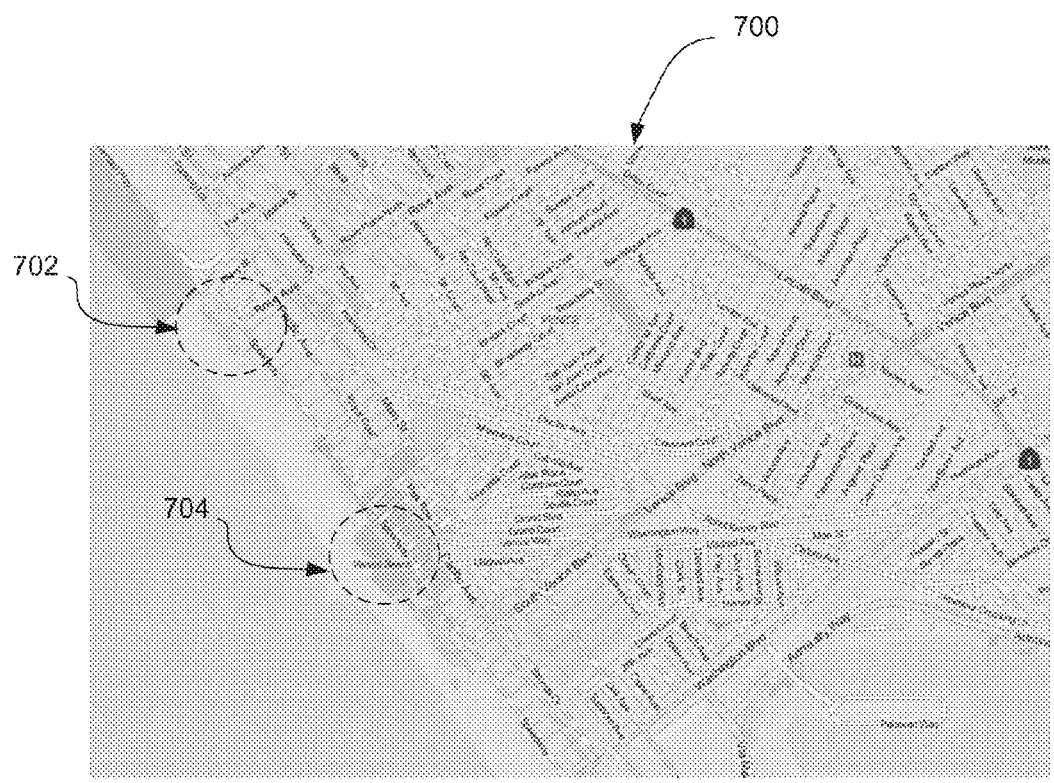
FIG. 7A shows an example of a graphical user interface illustrating geolocations of media items on a map.

FIG. 7A shows an example of GUI for a user to select pictures for placement in a map 700. The map 700 illustrates geolocations boundaries of selected media items. The map 700 includes geolocation boundaries 702 and 704. Each geolocation boundary is associated with one or more media items previously selected by the user of the mobile device 602. For example, pictures 606 and 608 may have been generated in geolocation boundary 702. Picture 610 may have been generated in geolocation boundary 704.

Figure 7B:
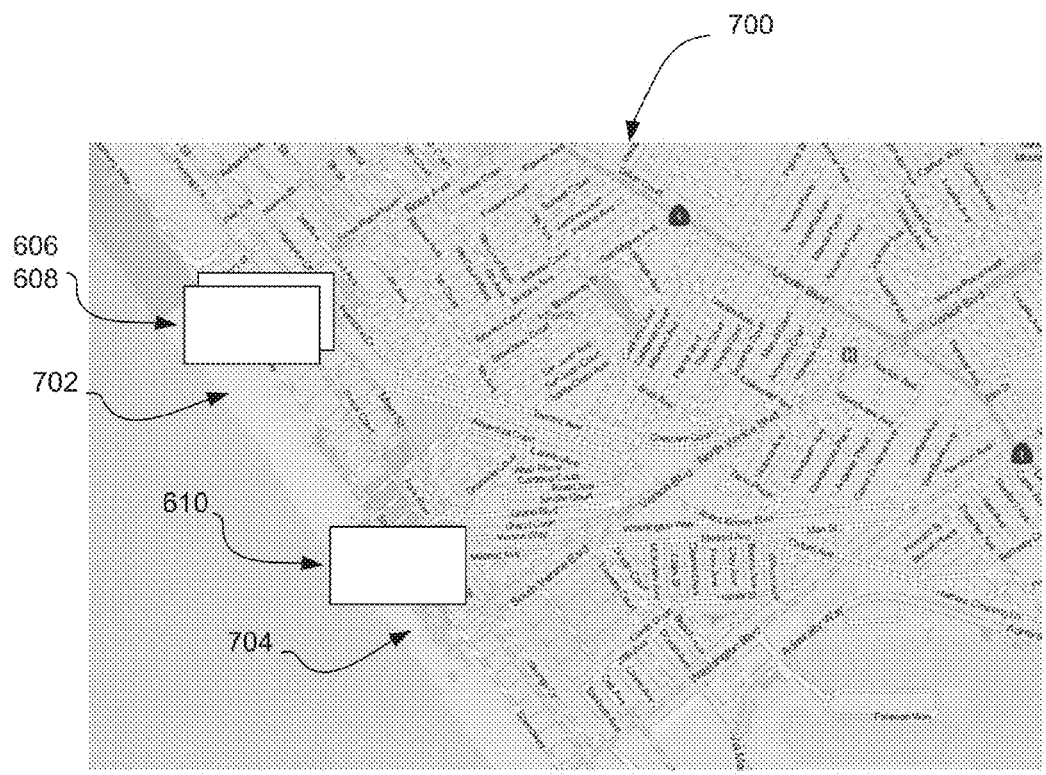
FIG. 7B shows another example of a graphical user interface illustrating media items placed at their respective geolocations on a map.

FIG. 7B shows another example of the map 700 illustrating thumbnails of selected pictures 606, 608, and 610 placed at their respective geolocation boundaries 702 and 704 on the map 700.

Figure 8A:
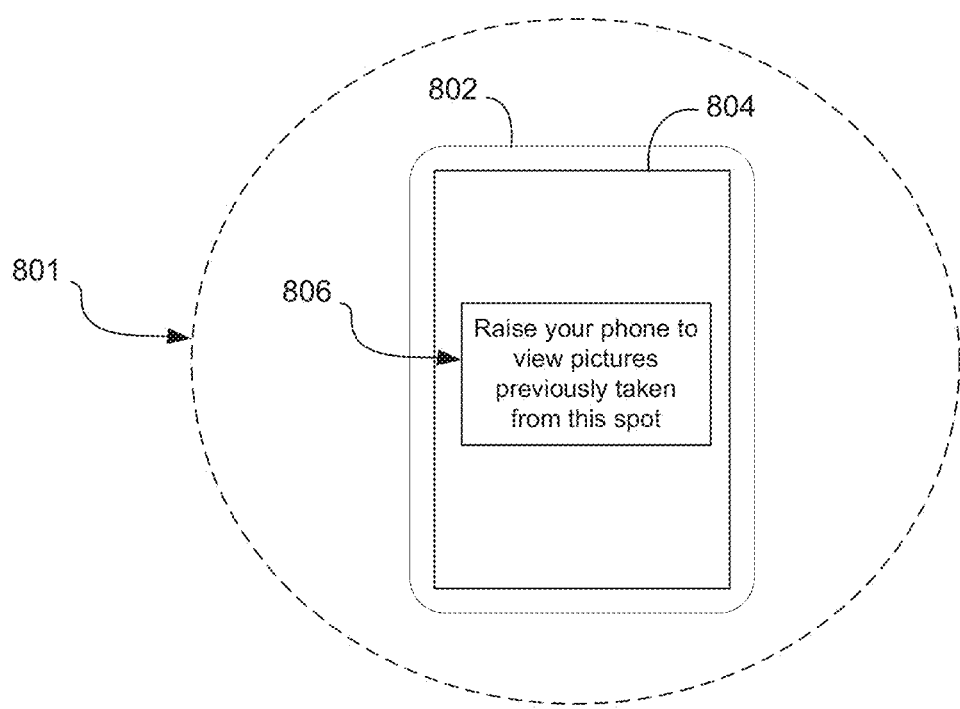
FIG. 8A shows an example of a notification to view a media item based on a geolocation of the mobile device.

FIG. 8A shows an example of a notification to view a media item based on a geolocation of a mobile device. A mobile device 802 determines that it is located within a geolocation boundary 801 of a previously selected picture. The mobile device 802 generates a notification 806 in a display 804. The notification 806 informs the user of the mobile device 802 to hold the mobile device 802 up (or raise the mobile device to an eye level position) to view the selected picture that was previously captured from the same spot. The previously selected picture may have been captured with the mobile device 802 or using another mobile device.

Figure 8B:
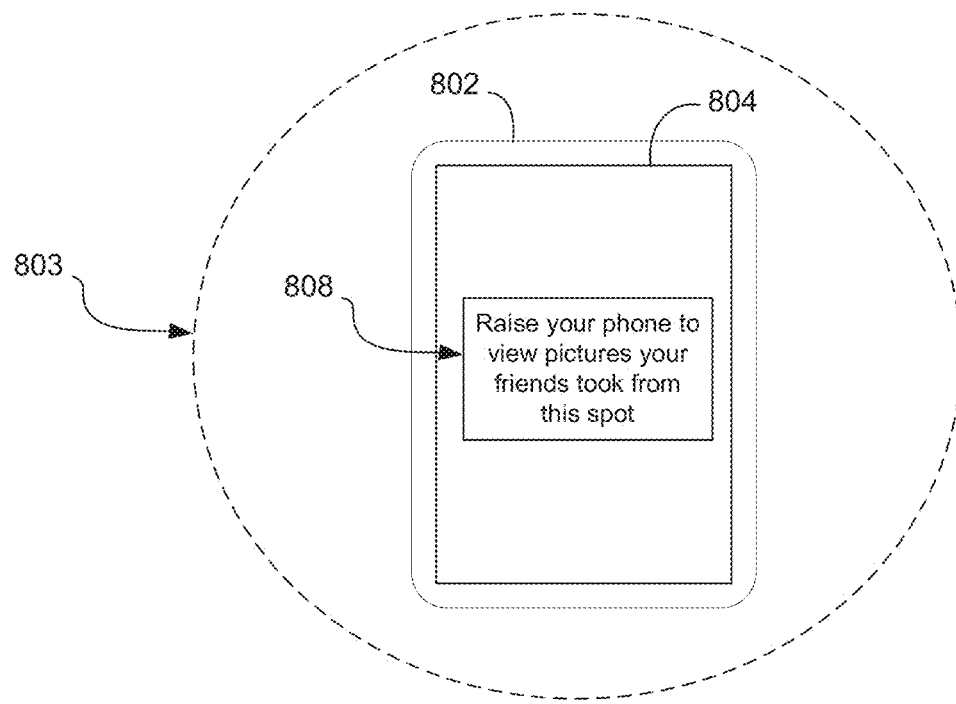
FIG. 8B shows an example of a notification to view a shared media item based on a geolocation of the mobile device.

FIG. 8B shows an example of a notification to view a shared media item based on a geolocation of the mobile device 802. The mobile device 802 determines that it is located within a geolocation boundary 803 of a shared picture. The mobile device 802 generates a notification 808 in the display 804. The notification 808 informs the user of the mobile device 802 to hold the mobile device 802 up to view the shared picture that was captured from the same spot.

Figure 8C:
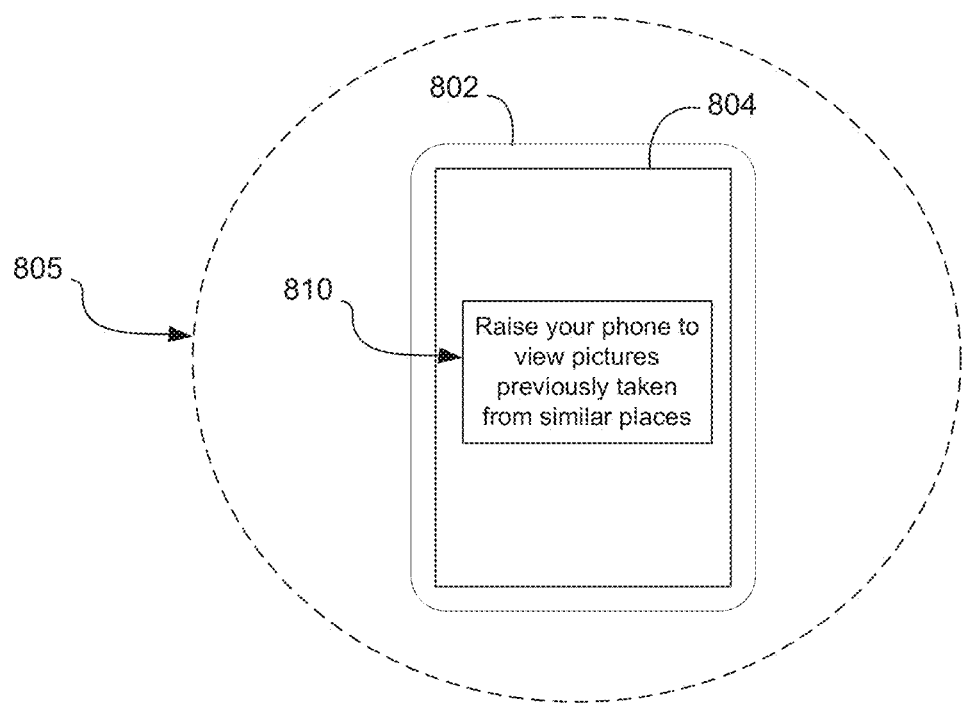
FIG. 8C shows another example of a notification to view a media item based on a geolocation of the mobile device.

FIG. 8C shows another example of a notification to view a media item based on a geolocation of the mobile device 802. The mobile device 802 determines that it is located within a geolocation boundary 805 of a previously selected picture. The picture was captured at a different geolocation from the geolocation boundary 805. The picture was placed on a map corresponding to the geolocation boundary 805. The mobile device 802 generates a notification 810 in the display 804. The notification 810 informs the user of the mobile device 802 to hold the mobile device 802 up to view the selected picture that was captured at another geolocation. In another example embodiment, pictures taken from similar places may share their geolocation boundaries. For example, the mobile device 802 may associate a picture taken at a sushi restaurant with a geolocation of other known sushi restaurants. So when the user of the mobile device 802 walks into any sushi restaurant, the user will have immediate access to all the pictures the user previously took at other sushi restaurants. The user can thus compare the sushi from the current restaurant with pictures of sushi from sushi restaurants the user previously visited.

In another similar example, the user of the mobile device 802 takes a picture of a citrus tree at the Home Depot. The user then proceeds with taking many pictures from other events such as birthday parties. When the user later walks into a different hardware store, such as Lowes, to compare the price of the same type of citrus tree from the Home Depot, the user would typically browse through many pictures previously taken at the birthday parties before reaching the picture of the citrus tree taken at the Home Depot. The media display application 112 avoids this problem by placing the picture of the citrus tree at geolocations of other hardware stores in the area. As such, the mobile device 802 displays the picture of the citrus tree taken at the Home Depot as soon as the user walks into any hardware store.

Figure 8D:
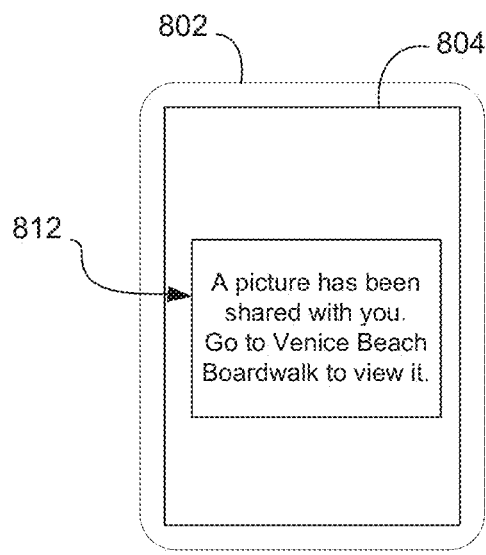
FIG. 8D shows an example of a notification including instructions on how to view a shared media item at the mobile device.

FIG. 8D shows an example of a notification including instructions on how to access a shared media item at a mobile device. The mobile device 802 receives a message that includes a shared picture and access conditions. The mobile device 802 can only view the shared picture when the mobile device 802 meets the access conditions. The mobile device 802 generates a notification 812 in the display 804. For example, the notification 810 informs the user of the mobile device 802 to go to a specific geolocation based on the access conditions to access and view the shared picture.

Figure 8E:
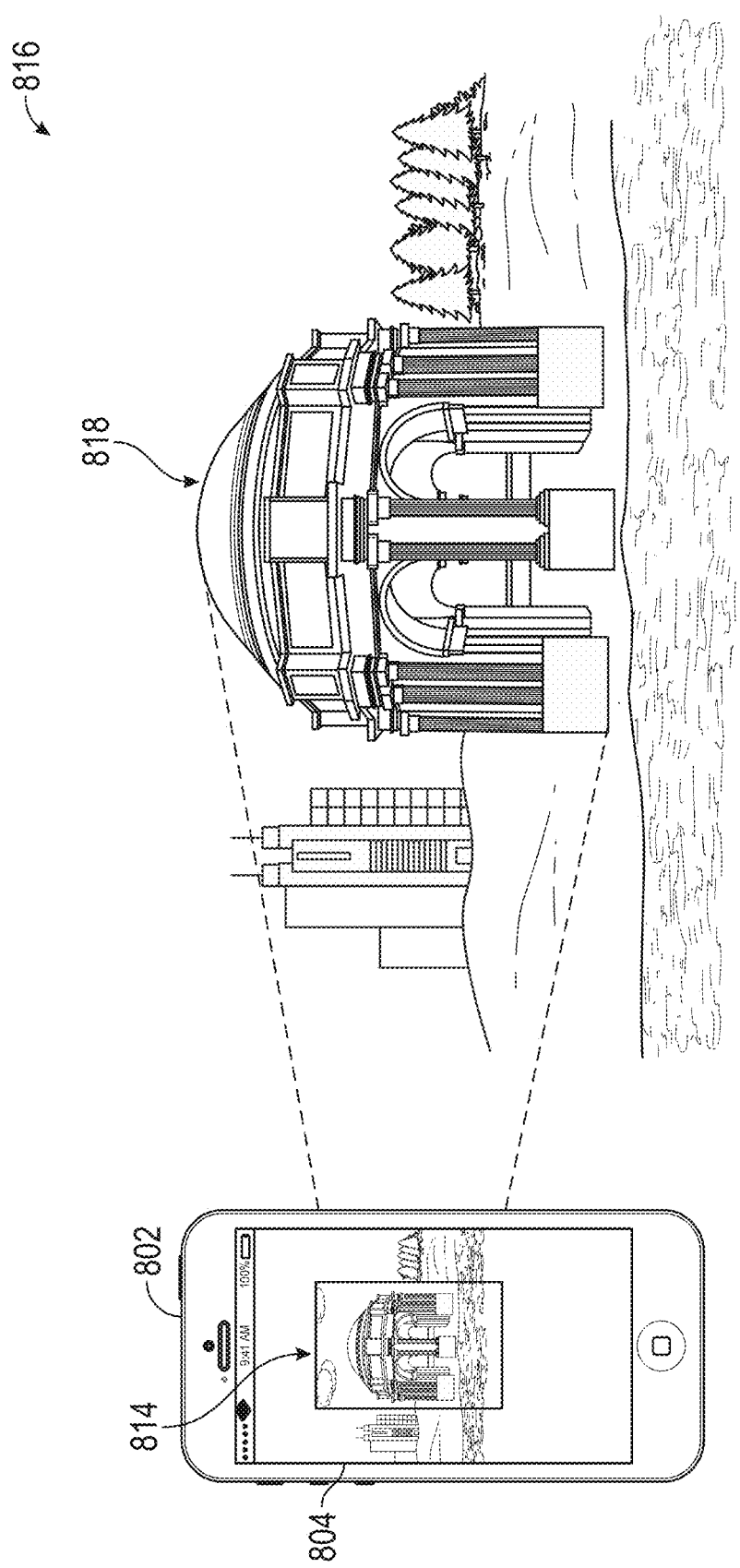
FIG. 8E shows an example of a display of a previously selected picture in a mobile device.

FIG. 8E shows an example of a display of a previously selected picture in a mobile device. The mobile device 802 is at a spot where the previously selected picture was captured. The mobile device 802 is also pointed in about the same direction that the mobile device 802 was pointed when the previously selected picture was captured. For example, the mobile device 802 is pointed towards a landscape 816 including a landmark 818. The user of the mobile device 802 previously captured a picture of the landmark 818. When the user holds up the mobile device 802, the previously captured picture 814 is overlaid on top of a current view of the landscape 816 in the display 804. In another example, a time filter may be applied to the previously selected pictures to display only pictures taken within the last year or any other predefined period of time.

Figure 9A:
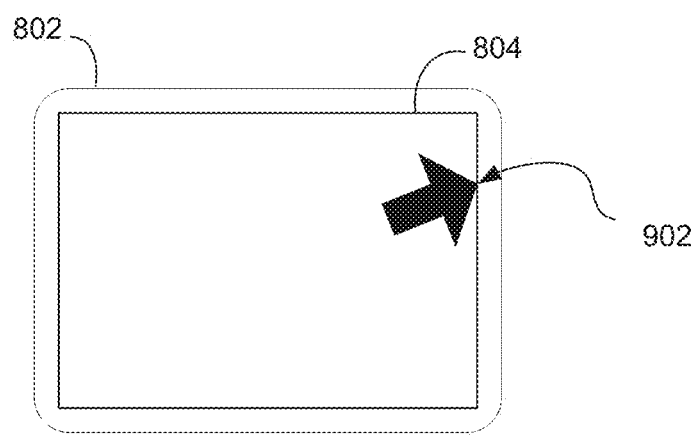
FIG. 9A is a diagram illustrating an example of a visual guide in a graphical user interface for accessing a media item at a geolocation of the mobile device.

FIG. 9A is a diagram illustrating an example of a visual guide in a graphical user interface for accessing a media item at a geolocation of a mobile device. Once the mobile device 802 is at a geolocation specified in the access conditions, the display 804 includes a visual guide 902 to help the user orient the mobile device 802 to view the media items. For example, the display 804 displays the visual guide 902 in the form of an arrow to guide the user to move the mobile device 804 in the direction indicated by the arrow.

Figure 9B:
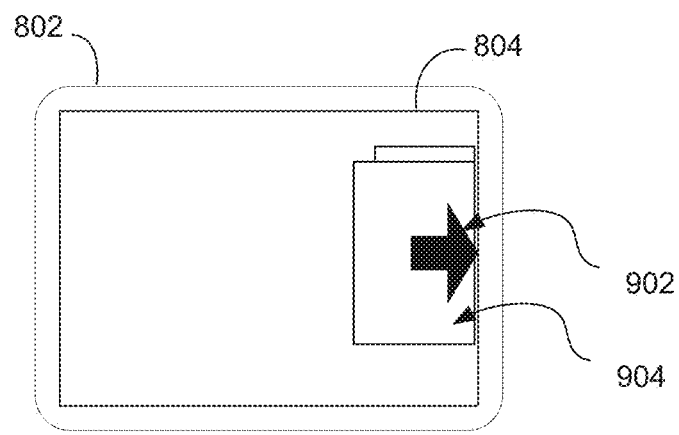
FIG. 9B is a diagram illustrating another example of a visual guide in a graphical user interface for accessing a media item at a geolocation of the mobile device.

FIG. 9B is a diagram illustrating another example of a visual guide in a graphical user interface for accessing a media item at a geolocation of a mobile device. The display 804 shows a portion of the media items 904 as the position of the mobile device 802 gets closer to the position boundary defined by the access conditions of the media items.

Figure 9C:
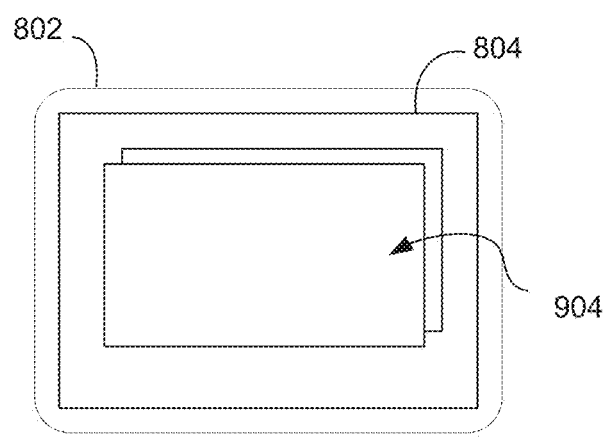
FIG. 9C is a diagram illustrating an example of a graphical user interface for accessing a media item at a geolocation of the mobile device.

FIG. 9C is a diagram illustrating an example of a graphical user interface for accessing a media item at a geolocation of the mobile device. The display position of the media items 904 is adjusted relative to the display 804 of the mobile device 802 based on the position of the mobile device 802 relative to the position boundary for the media items.

FIG. 10A shows an interaction diagram illustrating one example embodiment of a process for sharing a media item. A user of the mobile device 510 selects a media item for sharing at operation 1002. In one example, operation 1002 may be implemented using the media capture application 108 of FIG. 1. The mobile device 510 generates access conditions for the shared media item at operation 1004. In one example, operation 1004 may be implemented using the media placement application 110 of FIG. 1. The mobile device 510 sends the shared media item and corresponding access conditions to the mobile device 512 at operation 1006. In one example, operation 1006 may be implemented using the media sharing application 114 of FIG. 1. The mobile device 512 determines whether the geolocation (and optionally the physical position) of the mobile device 512 meet the access conditions of the shared media item at operation 1008. In one example, operation 1008 may be implemented using the media display application 112 of FIG. 1. The mobile device 512 generates a display of the shared media item after the access conditions of the shared media item are met at operation 1010. In one example, operation 1010 may be implemented using the media display application 112 of FIG. 1.

Figure 10B:
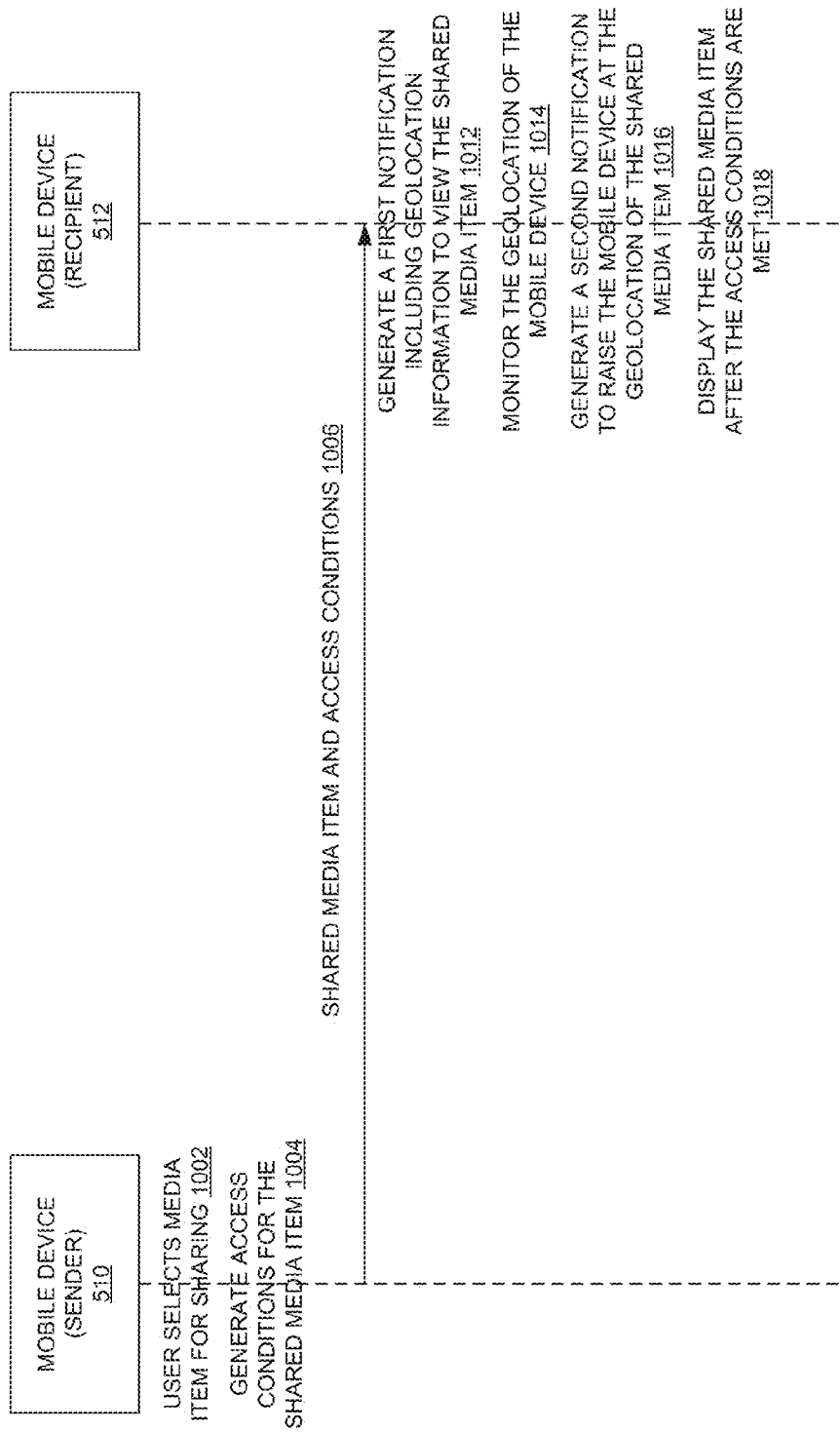
FIG. 10B shows an interaction diagram illustrating another example embodiment of a process for sharing a media item.

FIG. 10B shows an interaction diagram illustrating another example embodiment of a process for sharing a media item. A user of the mobile device 510 selects a media item for sharing at operation 1002. The mobile device 510 generates access conditions for the shared media item at operation 1004. The mobile device 510 sends the shared media item and corresponding access conditions to a mobile device 512 at operation 1006. The mobile device 512 generates a first notification to instruct the user of the mobile device 512 to go to a specific geolocation to access and view the shared media item at operation 1012. The mobile device 512 monitors the geolocation of the mobile device 512 at operation 1014. The mobile device 512 generates a second notification to instruct the user of the mobile device 512 to raise the mobile device 512 in a particular direction to view the shared media item at operation 1016. The mobile device 512 displays the shared media item after the mobile device 512 meets the access conditions at operation 1018. In one example, operations 1012, 1014, 1016, and 1018 may be implemented using the media display application 112 of FIG. 1.

Figure 10C:
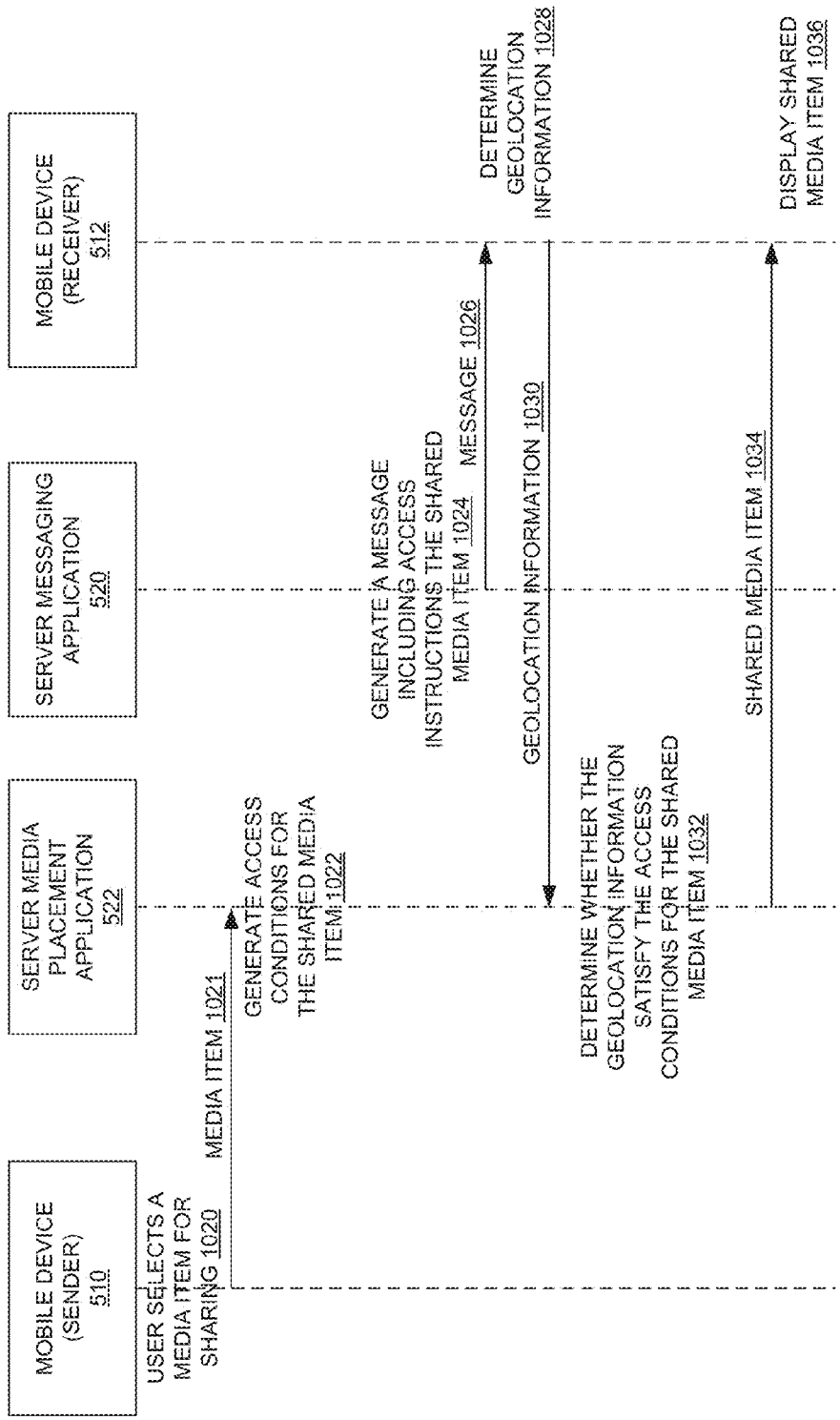
FIG. 10C shows an interaction diagram illustrating yet another example embodiment of a process for sharing a media item.

FIG. 10C shows an interaction diagram illustrating yet another example embodiment of a process for sharing a media item. A user of the mobile device 510 selects a media item for sharing at operation 1020. The mobile device 510 communicates the shared media item to the server media placement application 522 of FIG. 5 at operation 1021. The server media placement application 522 generates access conditions for the shared media item at operation 1022. The server messaging application 520 generates a message including access instructions to the shared media item at operation 1024. The server messaging application 520 sends the message to the mobile device 512 at operation 1026. The mobile device 512 determines its geolocation at operation 1028. The mobile device 512 sends its geolocation information to the server media placement application 522 at operation 1030. The server media placement application 522 determines whether the geolocation information satisfies the access conditions for the shared media item at operation 1032. The server media placement application 522 sends the shared media item after access conditions for the shared media item are met at operation 1034. The mobile device 512 generates a display of the shared media item at operation 1036.

Figure 11:
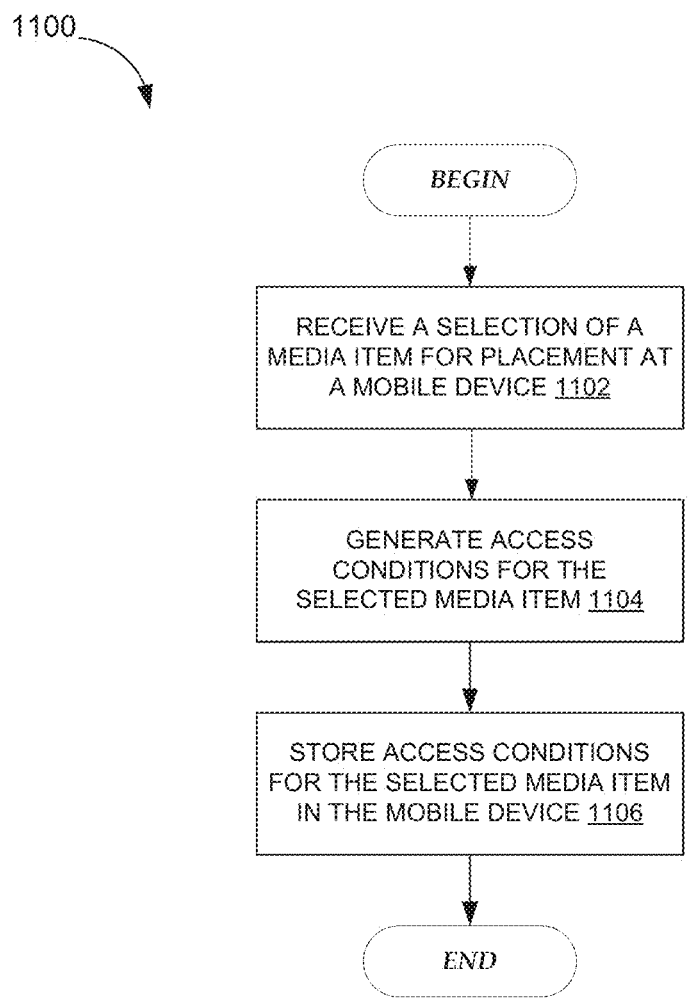
FIG. 11 shows a flow diagram illustrating one example embodiment of a method for generating access conditions for a selected media item.

FIG. 11 shows a flow diagram illustrating one example embodiment of a method 1100 for generating access conditions for a selected media item. At operation 1102, a mobile device receives a selection of a media item for placement. At operation 1104, the mobile device generates access conditions for the selected media item. At operation 1106, the mobile device stores the access conditions for the selected media item at the mobile device. In one embodiment, operations 1102, 1104, and 1106 may be implemented using the media placement application 110 of FIG. 1.

Figure 12:
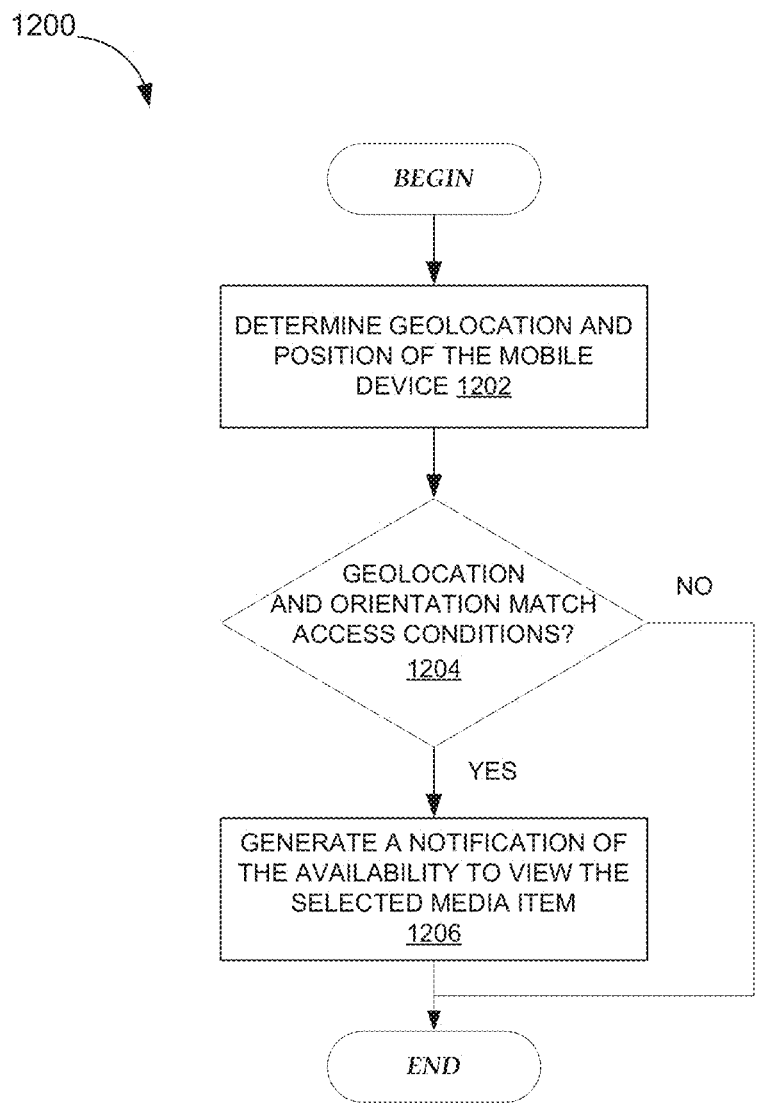
FIG. 12 shows a flow diagram illustrating another example embodiment of a method for accessing a selected media item.

FIG. 12 shows a flow diagram illustrating another example embodiment of a method 1200 for accessing the selected media item. At operation 1202, a mobile device determines its current geolocation and position. At operation 1204, the mobile device determines whether a combination of its current geolocation and position match or satisfy the access conditions generated at operation 1104 of FIG. 11. At operation 1206, the mobile device generates a notification of the availability to view the selected media item associated with the access conditions. In one embodiment, operations 1202, 1204, and 1206 may be implemented using the media display application 112 of FIG. 1.

Figure 13:
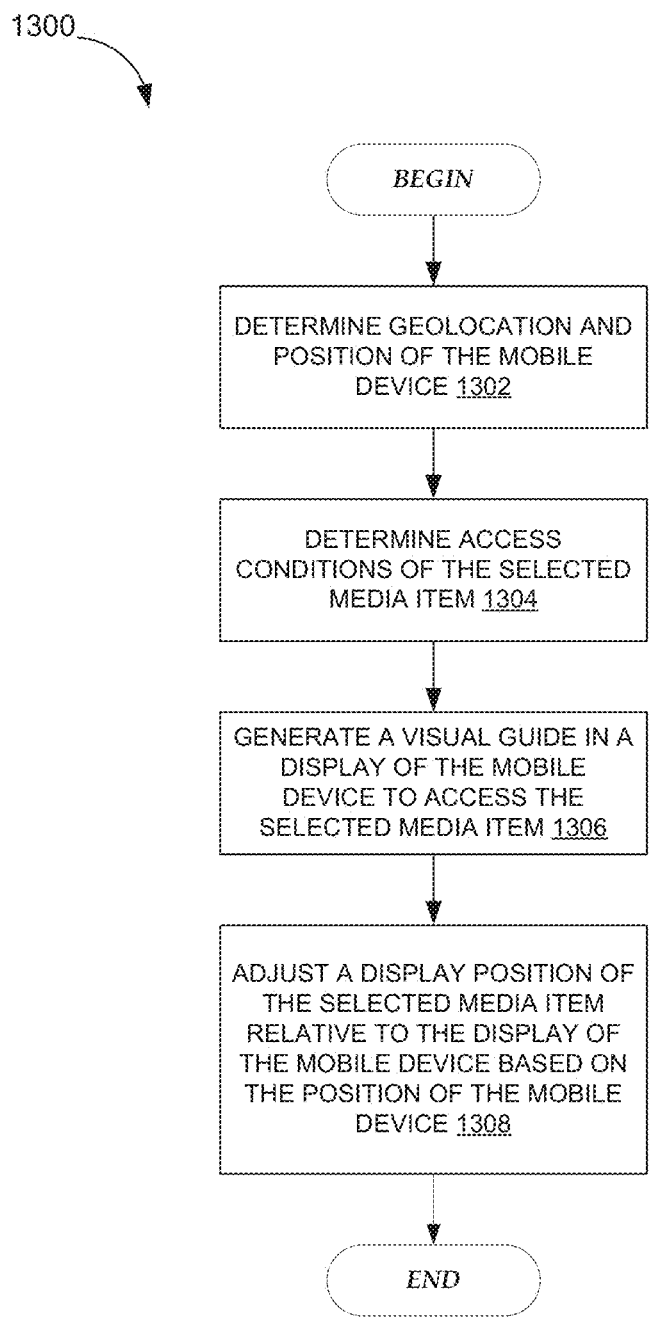
FIG. 13 shows a flow diagram illustrating one example embodiment of a method for generating a visual guide to access a selected media item.

FIG. 13 shows a flow diagram illustrating one example embodiment of a method 1300 for generating a visual guide to access the selected media item. At operation 1302, a mobile device determines its geolocation and position. At operation 1304, the mobile device determines access conditions for a selected media item. At operation 1306, the mobile device generates a visual guide in a display of the mobile device to access the selected media item. At operation 1308, the mobile device adjusts a display position of the selected media item related to the display of the mobile device based on the position of the mobile device. In one embodiment, operations 1302, 1304, and 1306 may be implemented using the media display application 112 of FIG. 1.

Figure 14:
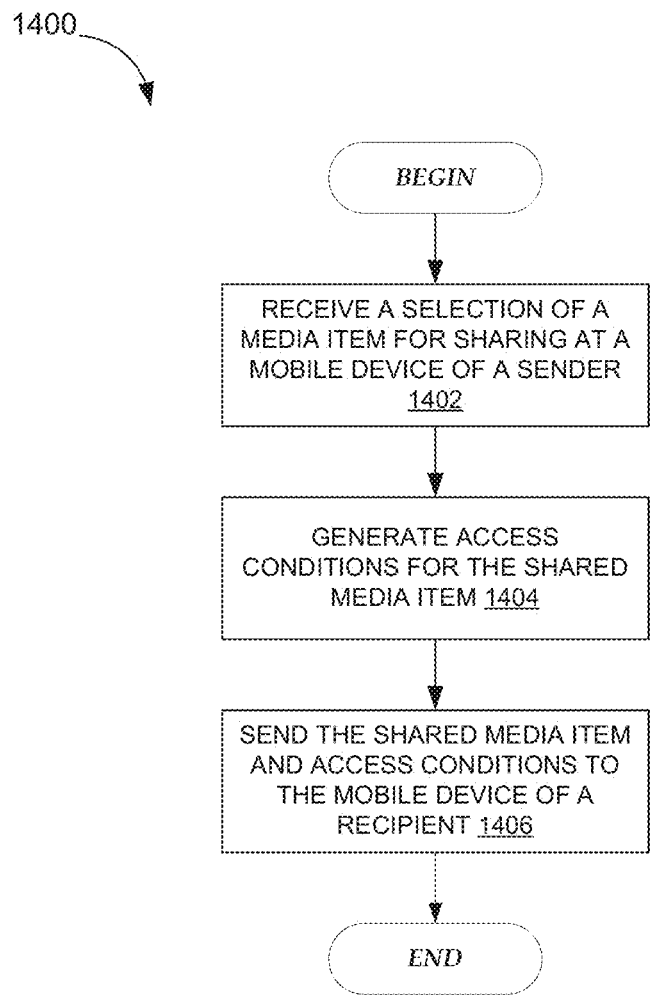
FIG. 14 shows a flow diagram illustrating one example embodiment of a method for sharing a media item.

FIG. 14 shows a flow diagram illustrating one example embodiment of a method 1400 for sharing a media item. At operation 1402, a user selects, at a mobile device, a media item for sharing with another mobile device. At operation 1404, the mobile device generates access conditions for the shared media item. At operation 1406, the mobile device sends the shared media item and the access conditions to the other mobile device. In one embodiment, operations 1402 and 1404 may be implemented using the media placement application 110 of FIG. 1. Operation 1406 may be implemented using the media sharing application 114 of FIG. 1.

Figure 15:
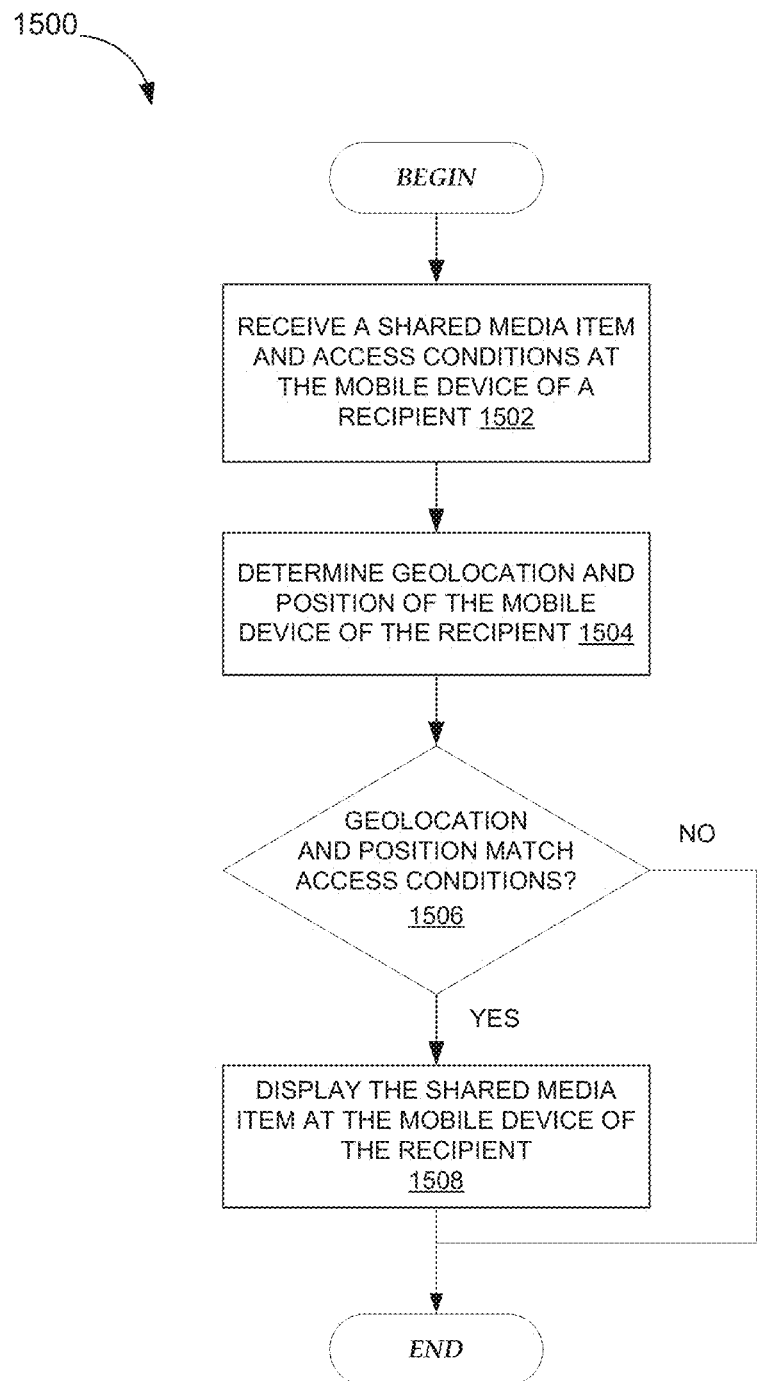
FIG. 15 shows a flow diagram illustrating one example embodiment of a method for accessing a shared media item.

FIG. 15 shows a flow diagram illustrating one example embodiment of a method 1500 for accessing a shared media item. At operation 1502, a mobile device receives a shared media item and corresponding access conditions. At operation 1504, the mobile device determines its current geolocation and position. At operation 1506, the mobile device determines whether a combination of its geolocation and position match the received access conditions. At operation 1508, the mobile device displays the shared media item when the access conditions are met. Operations 1502, 1504, 1506, and 1508 may be implemented using the media display application 112.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 504 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 16:
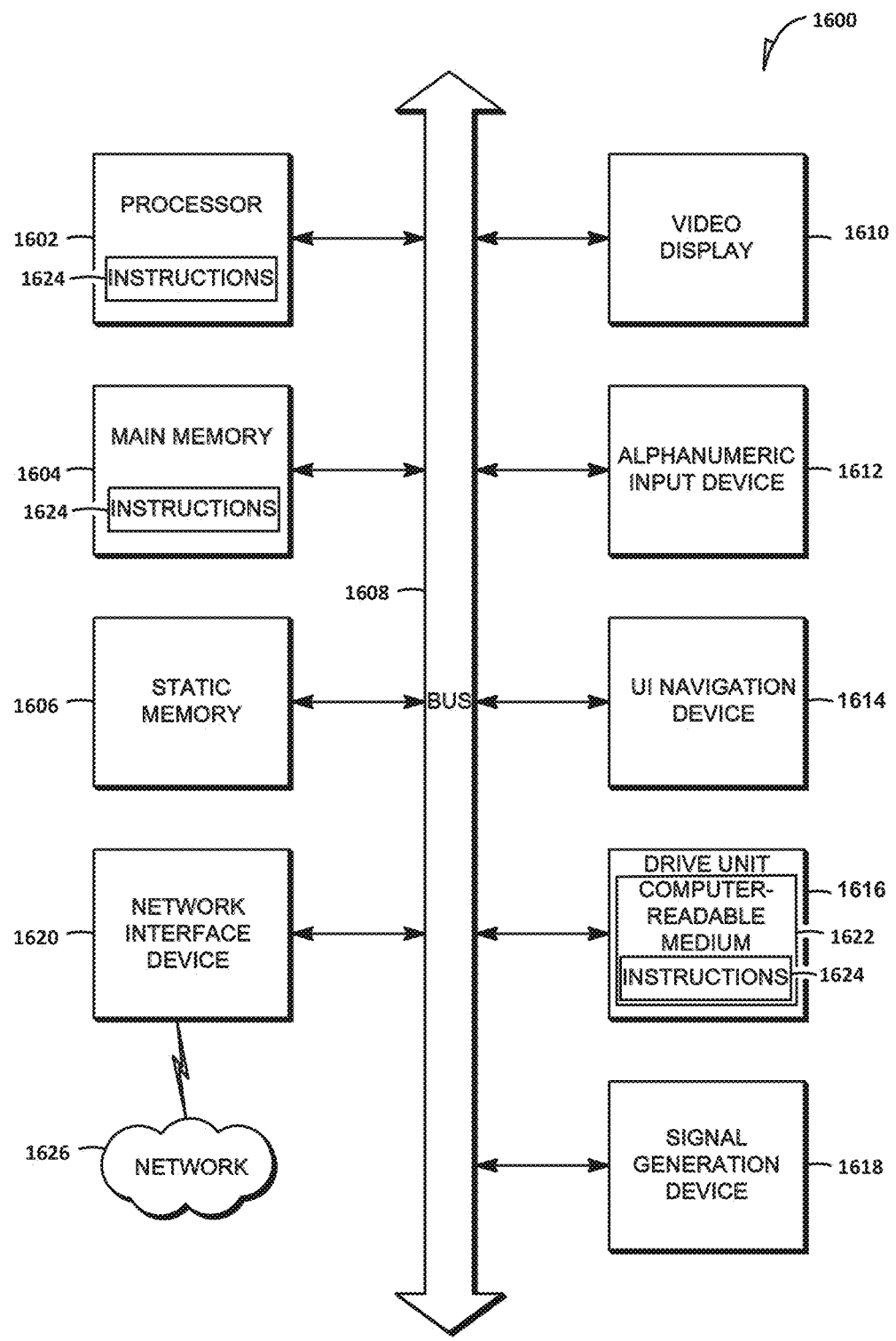
FIG. 16 shows a diagrammatic representation of machine, in the example form of a computer system, within which a set of instructions may be executed to cause the machine to perform any one or more of the methodologies discussed herein.

FIG. 16 shows a diagrammatic representation of a machine in the example form of a machine or computer system 1600 within which a set of instructions 1624 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine and in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1624 (sequential or otherwise) that specify actions to be taken by that machine. Further, while only a single machine is illustrated, the term "machine" shall also be taken to include any collection of machines that individually or jointly execute a set (or multiple sets) of instructions 1624 to perform any one or more of the methodologies discussed herein.

The example computer system 1600 includes a processor 1602 (e.g., a central processing unit (CPU), a graphics processing unit (GPU), or both), a main memory 1604, and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a UI navigation device 1614 (e.g., a mouse), a drive unit 1616, a signal generation device 1618 (e.g., a speaker), and a network interface device 1620.

The drive unit 1616 includes a computer-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604 or within the processor 1602 during execution thereof by the computer system 1600, with the main memory 1604 and the processor 1602 also constituting machine-readable media.

The instructions 1624 may further be transmitted or received over a network 1626 via the network interface device 1620 utilizing any one of a number of well-known transfer protocols (e.g., HTTP).

While the computer-readable medium 1622 is shown in an example embodiment to be a single medium, the term "computer-readable medium" should be taken to include a single medium or multiple media (e.g., a centralized or distributed database, and/or associated caches and servers) that store the one or more sets of instructions 1624. The term "computer-readable medium" shall also be taken to include any medium that is capable of storing, encoding, or carrying a set of instructions 1624 for execution by the machine that cause the machine to perform any one or more of the methodologies of the present disclosure, or that is capable of storing, encoding, or carrying data structures utilized by or associated with such a set of instructions 1624. The term "computer-readable medium" shall, accordingly, be taken to include, but not be limited to, solid-state memories, optical media, and magnetic media.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A mobile device comprising:
at least one hardware processor comprising a media placement application and a media display application,
the media placement application configured to:
receive a selection of a media item generated by the mobile device,
generate access conditions for the media item based on geolocation and position information of the mobile device associated with the selected media item, and
store access conditions in a storage device of the mobile device,
the media display application configured to:
monitor a geolocation and position of the mobile device,
determine whether the geolocation and position of the mobile device meet the access conditions of the selected media item, and
generate a notification that the selected media item is available to view in a display of the mobile device in response to determining that the geolocation and position of the mobile device meet the access conditions of the selected media item;
a Global Positioning System (GPS) sensor configured to generate the geolocation information of the mobile device;
a position sensor configured to determine the position information based on a physical position of the mobile device relative to a frame of reference; and
a media capture application configured to generate the media item and to associate the media item with the geolocation and position information,
the media placement application further comprising:
a camera module configured to access the selected media item generated by the mobile device,
a geolocation module configured to access the geolocation information associated with the selected media item,
a position module configured to access the position information associated with the selected media item,
a placement parameters module configured to access placement parameters that define a geolocation range and a position range for the access conditions of the selected media item, and
a media placement engine configured to define access conditions comprising a geolocation boundary and a position boundary for the selected media item, the geolocation boundary for the selected media item based on the geolocation range and the geolocation information, and the position boundary for the selected media item based on the position range and the position information.

2. The mobile device of claim 1, wherein the media display application further comprises:
a media placement module configured to retrieve the access conditions for the selected media item; and
a media display engine configured to determine whether the geolocation of the mobile device is within the geolocation boundary for the selected media item and whether the position of the mobile device is within the position boundary for the selected media item, the media display engine causing the selected media item to be displayed in the display of the mobile device in response to the geolocation and position of the mobile device being respectively within the geolocation boundary and the position boundary.

3. The mobile device of claim 1, wherein the media display engine is configured to:
generate a visual guide in the display of the mobile device, the visual guide including a directional indicator to access the selected media item, and
adjust a display position of the selected media item relative to the display of the mobile device based on the position of the mobile device relative to the position boundary for the selected media item.

4. The mobile device of claim 1, wherein the media placement application is configured to:
receive a selection of a first media item generated by the mobile device, the first media item associated with a first geolocation,
receive a selection of a second geolocation on a map displayed in the mobile device,
generate access conditions for the first media item based on the second geolocation, and
wherein the media display application is configured to:
cause the first media item to be displayed in the display of the mobile device in response to the geolocation of the mobile device being within a second geolocation boundary based on the second geolocation.

5. The mobile device of claim 1, wherein the media sharing application further comprises:
a media placement module configured to retrieve the access conditions for the selected media item; and
a sharing module configured to communicate the selected media item and the access conditions of the selected media item to a second mobile device,
the second mobile device configured to:
identify a geolocation and position of the second mobile device,
determine whether the geolocation and position of the second mobile device meet the access conditions of the selected media item, and
generate a notification that the selected media item is available to view in a display of the second mobile device.

6. The mobile device of claim 1, wherein the media sharing application further comprises:
a media placement module configured to retrieve the access conditions for the selected media item; and
a sharing module configured to communicate the selected media item and the access conditions of the selected media item to a second mobile device,
the second mobile device configured to:
generate a first notification identifying a requested geolocation to access the selected media item, identify a geolocation and position of the second mobile device, determine whether the geolocation and position of the second mobile device meet the access conditions of the selected media item, and generate a second notification that the selected media item is available to view in a display of the second mobile device.

7. The mobile device of claim 1, wherein the media placement application is configured to communicate with a server media placement application of a server, the server media placement application configured to:

receive a request to share a shared media item with a second mobile device;

receive access conditions corresponding to the shared media item;

receive a geolocation and position of the second mobile device;

determine whether the geolocation and position of the second mobile device meet the access conditions of the shared media item; and communicate the shared media item to the second mobile device.

8. The mobile device of claim 1, wherein the position information of the mobile device includes an azimuth angle and an elevation angle, wherein the access conditions include an azimuth angle range applied to the azimuth angle to generate an azimuth angle boundary, and an elevation angle range applied to the elevation angle to generate an elevation angle boundary, wherein the media placement application is configured to:

identify an updated azimuth angle and an updated elevation angle of the mobile device, generate the notification of the availability to view the selected media item in response to determining that the updated azimuth angle is within the azimuth angle boundary, that the updated elevation angle is within the elevation angle boundary, and that the geolocation of the mobile device is within a geolocation boundary associated with the selected media item.

9. A method comprising:

receiving a selection of a media item generated by the mobile device;

generating access conditions for the media item based on geolocation and position information of the mobile device associated with the selected media item;

storing access conditions in a storage device of the mobile device;

monitoring a geolocation and position of the mobile device;

determining whether the geolocation and position of the mobile device meet the access conditions of the selected media item;

generating a notification that the selected media item is available to view in a display of the mobile device in response to determining that the geolocation and position of the mobile device meet the access conditions of the selected media item;

generating the geolocation information of the mobile device;

determining the position information based on a physical position of the mobile device relative to a frame of reference;

generating the media item and associating the media item with the geolocation and position information;

accessing the selected media item generated by the mobile device;

accessing the geolocation information associated with the selected media item;

accessing the position information associated with the selected media item;

accessing placement parameters that define a geolocation range and a position range for the access conditions of the selected media item; and defining access conditions comprising a geolocation boundary and a position boundary for the selected media item, the geolocation boundary for the selected media item based on the geolocation range and the geolocation information, and the position boundary for the selected media item based on the position range and the position information.

10. The method of claim 9, further comprising:

retrieving the access conditions for the selected media item;

determining whether the geolocation of the mobile device is within the geolocation boundary for the selected media item and whether the position of the mobile device is within the position boundary for the selected media item; and causing the selected media item to be displayed in the display of the mobile device in response to the geolocation and position of the mobile device being respectively within the geolocation boundary and the position boundary.

11. The method of claim 10, further comprising:

generating a visual guide in the display of the mobile device, the visual guide including a directional indicator to access the selected media item; and adjusting a display position of the selected media item relative to the display of the mobile device based on the position of the mobile device relative to the position boundary for the selected media item.

12. The method of claim 9, further comprising:

receiving a selection of a first media item generated by the mobile device, the first media item associated with a first geolocation;

receiving a selection of a second geolocation on a map displayed in the mobile device;

generating access conditions for the first media item based on the second geolocation; and causing the first media item to be displayed in the display of the mobile device in response to the geolocation of the mobile device being within a second geolocation boundary based on the second geolocation.

13. The method of claim 9, further comprising:

retrieving the access conditions for the selected media item; and communicating the selected media item and the access conditions of the selected media item to a second mobile device, identifying a geolocation and position of the second mobile device;

determining whether the geolocation and position of the second mobile device meet the access conditions of the selected media item; and generating a notification that the selected media item is available to view in a display of the second mobile device.

14. The method of claim 9, further comprising:

retrieving the access conditions for the selected media item;

communicating the selected media item and the access conditions of the selected media item to a second mobile device, the second mobile device configured to:
  generate a first notification identifying a requested geolocation to access the selected media item,
  identify a geolocation and position of the second mobile device,
  determine whether the geolocation and position of the second mobile device meet the access conditions of the selected media item, and
  generate a second notification that the selected media item is available to view in a display of the second mobile device.

15. The method of claim 9, wherein the position information of the mobile device includes an azimuth angle and an elevation angle, wherein the access conditions include an azimuth angle range applied to the azimuth angle to generate an azimuth angle boundary, and an elevation angle range applied to the elevation angle to generate an elevation angle boundary, further comprising:
  identifying an updated azimuth angle and an updated elevation angle of the mobile device; and
  generating the notification that the selected media item is available to view in response to determining that the updated azimuth angle is within the azimuth angle boundary, that the updated elevation angle is within the elevation angle boundary, and that the geolocation of the mobile device is within a geolocation boundary associated with the selected media item.

16. A computer-readable storage medium having no transitory signals and storing a set of instructions that, when executed by a processor of a machine, cause the machine to perform operations comprising:
  receiving a selection of a media item generated by the mobile device;
  generating access conditions for the media item based on geolocation and position information of the mobile device associated with the selected media item;
  storing access conditions in a storage device of the mobile device;
  monitoring a geolocation and position of the mobile device;
  determining whether the geolocation and position of the mobile device meet the access conditions of the selected media item;
  generating a notification that the selected media item is available to view in a display of the mobile device in response to determining that the geolocation and position of the mobile device meet the access conditions of the selected media item;
  generating the geolocation information of the mobile device;
  determining the position information based on a physical position of the mobile device relative to a frame of reference;
  generating the media item and associating the media item with the geolocation and position information;
  accessing the selected media item generated by the mobile device;
  accessing the geolocation information associated with the selected media item;
  accessing the position information associated with the selected media item;
  accessing placement parameters that define a geolocation range and a position range for the access conditions of the selected media item; and
  defining access conditions comprising a geolocation boundary and a position boundary for the selected media item, the geolocation boundary for the selected media item based on the geolocation range and the geolocation information, and the position boundary for the selected media item based on the position range and the position information.

* * * * *